United States Patent
Toda

[11] Patent Number: 5,767,608
[45] Date of Patent: Jun. 16, 1998

[54] SURFACE ACOUSTIC WAVE DEVICE FOR SENSING A TOUCH-POSITION

[76] Inventor: Kohji Toda, 1-49-18 Futaba, Yokosuka 239, Japan

[21] Appl. No.: 812,704

[22] Filed: Mar. 6, 1997

[51] Int. Cl.⁶ .................................................. H01L 41/04
[52] U.S. Cl. .......................... 310/313 R; 310/313 B; 310/313 D; 333/193
[58] Field of Search .......................... 310/322, 313 R, 310/365, 313 B, 313 D; 333/193; 73/597

[56] References Cited

U.S. PATENT DOCUMENTS

| | | | |
|---|---|---|---|
| Re. 33,151 | 1/1990 | Adler | 340/712 |
| 4,293,734 | 10/1981 | Pepper, Jr. | 178/18 |
| 5,679,998 | 10/1997 | Toda | 310/313 R |

*Primary Examiner*—Mark O. Budd
*Assistant Examiner*—Timothy A. Williams

[57] ABSTRACT

A surface acoustic wave (SAW) position-sensing device comprising a piezoelectric substrate, an input interdigital transducer (IDT) T formed on an upper end surface of the piezoelectric substrate, and an output IDT R formed on the upper end surface of the piezoelectric substrate such that the finger direction of the IDT R is slanting to that of the IDT T by an angle $\alpha$. The thickness d of the piezoelectric substrate is larger than three times an interdigital periodicity P of the IDT T. An interdigital periodicity $P_N$ along the vertical direction to the finger direction of the IDT R is equal to the product of the interdigital periodicity P and $\cos \alpha$. An overlap length $L_P$ along the finger direction of the IDT R is equal to the product of an overlap length L of the T and $\sec \alpha$. When an electric signal is applied to the IDT T, the SAW is excited on the upper end surface of the piezoelectric substrate, and is transducer to electric signals $E_j$ with phases $\theta_j$ by the IDT R, the phases $\theta_j$ corresponding to positions $F_j$. The total phase $\Sigma \theta_j$ made by the phases $\theta_j$, and the total electric signal $\Sigma E_j$ made by the electric signals $E_j$ are zero. The IDT T and R form minute propagation lanes $Z_j$, corresponding to the positions $F_j$, of the SAW on the upper end surface of the piezoelectric substrate. If touching a position $F_x$ on a minute propagation lane $Z_x$, an electric signal E with a phase $\theta$ is delivered from the IDT R. The position $F_x$ corresponds to an electric signal $E_x$ with a phase $\theta_x$, the electric signal $\Sigma E_j$ minus the electric signal $E_x$ being equal to the electric signal E, the phase $\Sigma \theta_j$ minus the phase $\theta_x$ being equal to the phase $\theta$.

10 Claims, 7 Drawing Sheets

1

SURFACE ACOUSTIC WAVE DEVICE FOR SENSING A TOUCH-POSITION

BACKGROUND OF THE INVENTION

1. Field of the Invention.

The present invention relates to a surface acoustic wave device for sensing a touch-position on one end surface, having at least a surface acoustic wave transducing unit, of a piezoelectric substrate.

2. Description of the Prior Art.

An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destructive evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production. In addition, conventional-type transducers make use of decreasing or disappearance of output electric signal in accordance with decreasing or disappearance of an acoustic wave on the nonpiezoelectric plate by touching thereon, causing a high voltage operation with a high power consumption, and a large-scale circuit with a complicated structure.

Thus, it is difficult for conventional touch panels to realize a quick response-time, a low voltage operation and a low power consumption, an accurate detection of a minute touch-position, and a small-sized circuit with a simple structure. Moreover, there are some problems on manufacturing, mass production and operation frequencies.

SUMMARY OF THE INVENTION

An object of the present invention is to provide a surface acoustic wave position-sensing device capable of specifying a minute touch-position on one end surface of a piezoelectric substrate with a high sensitivity and a quick response time.

Another object of the present invention is to provide a surface acoustic wave position-sensing device excellent in manufacturing and mass-production.

A still other object of the present invention is to provide a surface acoustic wave position-sensing device operating under low power consumption with low voltage.

A still further object of the present invention is to provide a surface acoustic wave position-sensing device having a small-sized circuit with a simple structure which is very light in weight.

According to one aspect of the present invention there is provided a surface acoustic wave position-sensing device comprising a piezoelectric substrate having an upper— and a lower end surfaces running perpendicular to the direction of the thickness d thereof, an input interdigital transducer T formed on the upper end surface of the piezoelectric substrate, and an output interdigital transducer R formed on the upper end surface of the piezoelectric substrate such that the finger direction of the interdigital transducer R is slanting to that of the interdigital transducer T by an angle $\alpha$. The thickness d of the piezoelectric substrate is larger than three times an interdigital periodicity P of the interdigital transducer T. An interdigital periodicity $P_N$ along the vertical direction to the finger direction of the interdigital transducer R is equal to the product of the interdigital periodicity P and cos $\alpha$. An overlap length $L_p$ along the finger direction of the interdigital transducer R is equal to the product of an overlap length L of the interdigital transducer T and sec $\alpha$.

When an electric signal having a frequency approximately corresponding to the interdigital periodicity P is applied to the interdigital transducer T, the surface acoustic wave having the wavelength approximately equal to the interdigital periodicity P is excited on the upper end surface of the piezoelectric substrate effectively. The surface acoustic wave is transducer to electric signals $E_j$ (j=1, 2, ..., $\chi$) with phases $\theta_j$ (j=1, 2, ..., $\chi$) by the interdigital transducer R, the phases $\theta_j$ corresponding to positions $F_j$ (j=1, 2, ..., $\chi X$) along the finger direction of the interdigital transducer T, each electric signal $E_j$ having a frequency approximately corresponding to the interdigital periodicity P. The total phase $\Sigma\theta_j$ made by the phases $\theta_j$ is zero, and the total electric signal $\Sigma E_j$ made by the electric signals $E_j$ is also zero. Thus, the total electric signal $\Sigma E_j$ is not able to be detected at the interdigital transducer R. The interdigital transducers T and R form minute propagation lanes $Z_j$ (j=1, 2, ..., $\chi$) of the surface acoustic wave on the upper end surface of the piezoelectric substrate, the minute propagation lanes $Z_j$ corresponding to the positions $F_j$. If touching a position $F_x$ on a minute propagation lane $Z_x$, an electric signal E with a phase $\theta$ is delivered from the interdigital transducer R, the position $F_x$ corresponding to an electric signal $E_x$ with a phase $\theta_x$, the total electric signal $\Sigma E_j$ minus the electric signal $E_x$ being equal to the electric signal E, the total phase $\Sigma\theta_j$ minus the phase $\theta_x$ being equal to the phase $\theta$.

According to another aspect of the present invention there is provided a surface acoustic wave position-sensing device comprising the piezoelectric substrate, two surface acoustic wave transducing units X and Y, and a controlling system connected with the surface acoustic wave transducing units X and Y. Each surface acoustic wave transducing unit consists of an input interdigital transducer To formed on the upper end surface of the piezoelectric substrate, N input interdigital transducers $T_i$ (i=1, 2, ..., N) formed on the upper end surface of the piezoelectric substrate, an output interdigital transducer $R_o$ opposed to the interdigital transducer To on the upper end surface of the piezoelectric substrate and placed such that the finger direction of the interdigital transducer $R_o$ runs parallel with that of the interdigital transducer $T_o$, and at least two output interdigital transducers $R_{i1}$ and $R_{i2}$ (i=1, 2, ..., N) opposed to each interdigital transducer $T_i$ on the upper end surface of the piezoelectric substrate and placed such that the finger direction of the interdigital transducers $R_{i1}$ and $R_{i2}$ is slanting to that of the interdigital transducer $T_i$ by an angle $\alpha$, respectively. The thickness d of the piezoelectric substrate is larger than three times an interdigital periodicity P of the interdigital transducers $T_o$, $T_i$, and $R_o$. An interdigital periodicity $P_N$ along the vertical direction to the finger direction of the interdigital transducers $R_{i1}$ and $R_{i2}$ is equal to the product of the interdigital periodicity P and cos $\alpha$. The sum of an overlap length $L_p$ along the finger direction of the interdigital transducer $R_{i1}$ and that of the interdigital transducer $R_{i2}$ is approximately equal to the product of an overlap length L of the interdigital transducer $T_i$ and sec α.

When an electric signal having a frequency approximately corresponding to the interdigital periodicity P is applied to the interdigital transducers $T_o$ and $T_i$, respectively, the surface acoustic wave having the wavelength approximately equal to the interdigital periodicity P is excited on the upper end surface of the piezoelectric substrate effectively. The surface acoustic wave excited by the interdigital transducer $T_o$ is transducer to an electric signal with a phase $θ_{base}$ by the interdigital transducer $R_o$. The surface acoustic wave excited by the interdigital transducer $T_i$ is transducer to electric signals $E_j$ (j=1, 2, . . . , χ) with phases $θ_j$ (j=1, 2, . . . , χ) by each of the interdigital transducers $R_{i1}$ and $R_{i2}$, the phases $θ_j$ corresponding to positions $F_j$ (j=1, 2, . . . , χ) on the upper end surface of the piezoelectric substrate, each electric signal $E_j$ having a frequency approximately corresponding to the interdigital periodicity P. The interdigital transducers $T_i$ and $R_{i1}$ form N propagation lanes $D_{i1}$ (i=1, 2, . . . , N) of the surface acoustic wave on the upper end surface of the piezoelectric substrate. The interdigital transducers $T_i$ and $R_{i2}$ form N propagation lanes $D_{i2}$ (i=1, 2, . . . , N) of the surface acoustic wave on the upper end surface of the piezoelectric substrate. Two neighbors of the propagation lanes $D_{i1}$ and $D_{i2}$ are closed or partially overlapping each other. The propagation lanes $D_{i1}$ and $D_{i2}$ of the surface acoustic wave transducing unit X and that of the surface acoustic wave transducing unit Y are vertical to each other. Each propagation lane consists of minute propagation lanes $Z_j$ (j=1, 2, . . . , χ) corresponding to the positions $F_j$. If touching a position $F_x$ on a minute propagation lane $Z_x$ out of the propagation lanes $D_{i1}$ and $D_{i2}$, an electric signal E with a phase θ is delivered from one of the interdigital transducers $R_{i1}$ and $R_{i2}$, the position $F_x$ corresponding to an electric signal $E_x$ with a phase $θ_x$, the total electric signal $ΣE_j$ minus the electric signal $E_x$ being equal to the electric signal E, the total phase $Σθ_j$ minus the phase $θ_x$ being equal to the phase θ. The controlling system senses a touch with a finger or others on the position $F_x$ by an appearance of the electric signal E at the one of the interdigital transducers $R_{i1}$ and $R_{i2}$, and finds the position $F_x$ by detecting the one, delivering the electric signal E, of the interdigital transducers $R_{i1}$ and $R_{i2}$, and by evaluating a difference between the phases θ and $θ_{base}$.

According to another aspect of the present invention there are provided N switches $W_i$ (i=1, 2, . . . , N) corresponding to the interdigital transducers $T_i$, an output terminal of each switch $W_i$ being connected with an input terminal of each interdigital transducer $T_i$. Output terminals of the interdigital transducers $R_{i1}$ are connected with each other at an output point $Q_1$. Output terminals of the interdigital transducers $R_{i2}$ are connected with each other at an output point $Q_2$. The controlling system turns on and off the switches $W_i$ with a fixed period in turn, senses a touch on the position $F_x$ by an appearance of the electric signal E at one of the output points $Q_1$ and $Q_2$, and finds the position $F_x$ by detecting the one, delivering the electric signal E, of the output points $Q_1$ and $Q_2$, by choosing a closed one out of the switches $W_1$ when the electric signal E appears, and by evaluating the difference between the phases θ and $θ_{base}$.

According to other aspect of the present invention there is provided an amplifier $A_x$, an input terminal of the interdigital transducer $R_o$ of the surface acoustic wave transducing unit X being connected with each input terminal of the interdigital transducer $T_o$ of the surface acoustic wave transducing units X and Y via the amplifier $A_x$. The interdigital transducers $T_o$ and $R_o$ of the surface acoustic wave transducing unit X, a propagation lane of a surface acoustic wave between the interdigital transducers $T_o$ and $R_o$ in the surface acoustic wave transducing unit X, and the amplifier $A_x$ form an oscillator.

According to a further aspect of the present invention there is provided a piezoelectric substrate made of a piezoelectric ceramic, the polarization axis thereof being parallel to the thickness direction thereof.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
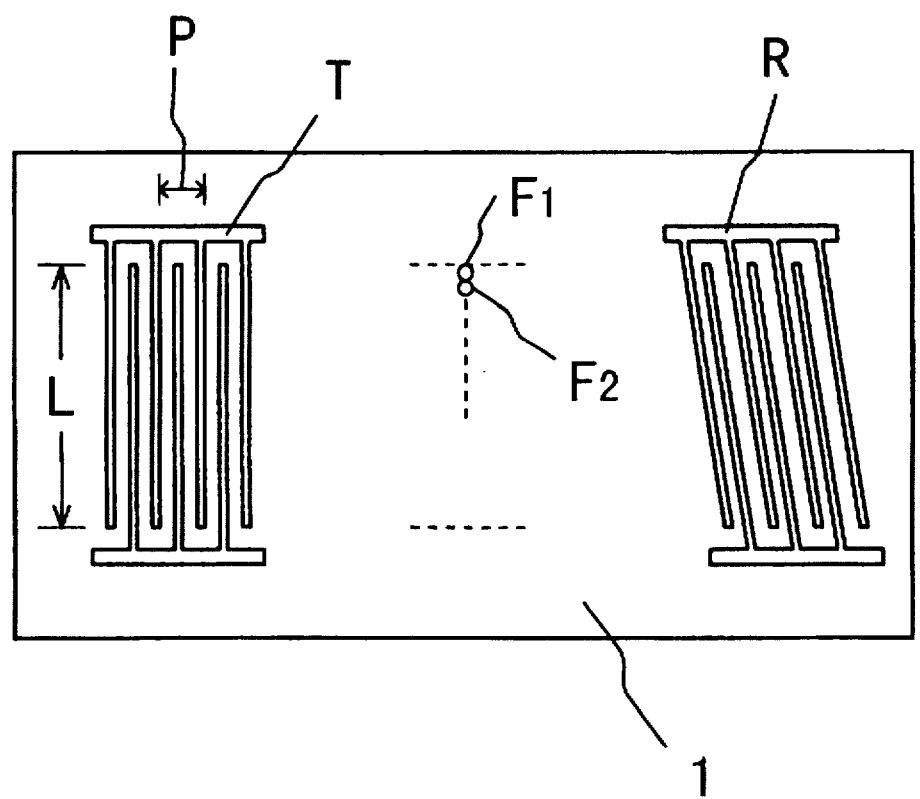
FIG. 1 shows a plan view of a surface acoustic wave position-sensing device according to a first embodiment of the present invention.

FIG. 1 shows a plan view of a surface acoustic wave position-sensing device according to a first embodiment of the present invention. The surface acoustic wave position-sensing device comprises piezoelectric substrate (1) having an upper—and a lower end surfaces running perpendicular to the direction of the thickness d thereof, input interdigital transducer (T) and output interdigital transducer (R) formed on the upper end surface of piezoelectric substrate (1). Piezoelectric substrate (1), of which material is piezoelectric ceramic, has a dimension of 1.5 mm in thickness. Interdigital transducers (T and R), made from aluminium thin film, consist of ten finger pairs, respectively. Interdigital transducer (T) has a common-type construction with an interdigital periodicity P of 400 μm and an overlap length L of 12 mm. The finger direction of interdigital transducer (R) is not parallel to that of interdigital transducer (T). In the surface acoustic wave position-sensing device, it is possible to sense a touch with a finger or others on one of positions $F_j$ (j=1, 2, . . . , χ) along the finger direction of interdigital transducer (T) on the upper end surface of piezoelectric substrate (1).

Figure 2:
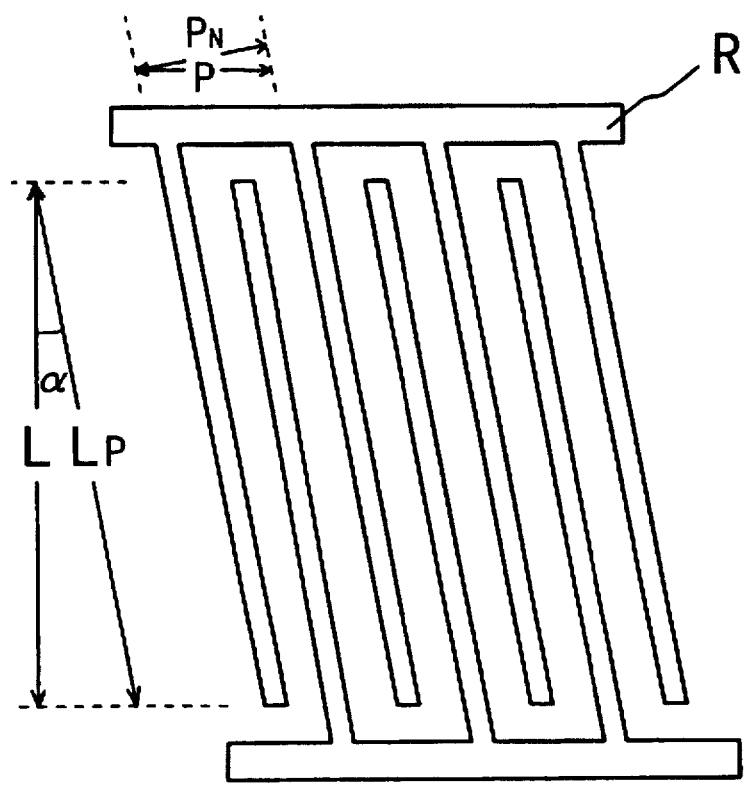
FIG. 2 shows a plan view of interdigital transducer (R).

FIG. 2 shows a plan view of interdigital transducer (R). Interdigital transducer (R) is located such that the finger direction thereof is slanting to that of interdigital transducer (T) by an angle α, an interdigital periodicity $P_N$ along the vertical direction to the finger direction of interdigital transducer (R) being equal to the product of the interdigital periodicity P and cos α. An overlap length $L_p$ along the finger direction of interdigital transducer (R) is equal to the product of the overlap length L of interdigital transducer (T) and sec α.

Figure 3:
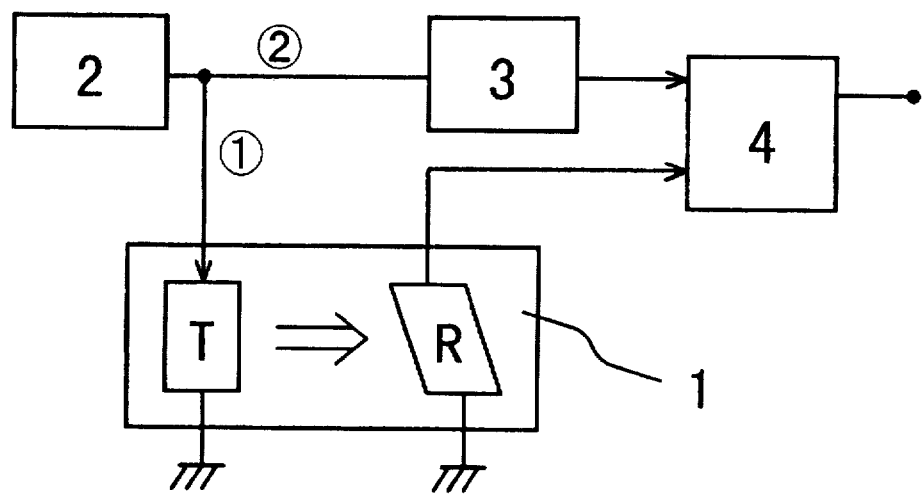
FIG. 3 shows a diagram of a driving circuit of the surface acoustic wave position-sensing device in FIG. 1.

FIG. 3 shows a diagram of a driving circuit of the surface acoustic wave position-sensing device in FIG. 1. The driving circuit includes oscillator (2), attenuator (3) and phase comparator (4). An electric signal ① is transmitted from oscillator (2) to interdigital transducer (T). On the other hand, an electric signal ② is transmitted from oscillator (2) to phase comparator (4) via attenuator (3). Because the thickness d of piezoelectric substrate (1) is larger than three times the interdigital periodicity P, the surface acoustic wave having the wavelength approximately equal to the interdigital periodicity P is excited on the upper end surface of piezoelectric substrate (1) effectively when the electric signal ① having a frequency approximately corresponding to the interdigital periodicity P is applied to interdigital transducer (T). In addition, because of using a piezoelectric ceramic having the polarization axis parallel to the thickness direction thereof, as piezoelectric substrate (1), the transducing efficiency from the electric signal ① to the surface acoustic wave increases.

An arrow on piezoelectric substrate (1) in FIG. 3 shows the transmitting direction of the surface acoustic wave. Interdigital transducers (T and R) form minute propagation lanes $Z_j$ (j=1, 2, . . . , $\chi$) of the surface acoustic wave on the upper end surface of piezoelectric substrate (1), the minute propagation lanes $Z_j$ corresponding to the positions $F_j$. The surface acoustic wave is transducer to electric signals $E_j$ (j=1, 2, . . . , $\chi$) with phases $\theta_j$ (j=1, 2, . . . , $\chi$) by interdigital transducer (R), the phases $\theta_j$ corresponding to the positions $F_j$, respectively. Each electric signal $E_j$ has a frequency approximately corresponding to the interdigital periodicity P. The total phase $\Sigma\theta_j$ made by the phases $\theta_j$ is zero, and the total electric signal $\Sigma E_j$ made by the electric signals $E_j$ is also zero. Thus, the total electric signal $E \Sigma E_j$ is not able to be detected at interdigital transducer (R). However, if touching a position $F_x$, out of the positions $F_j$, on a minute propagation lane $Z_x$ out of the minute propagation lanes $Z_j$, an electric signal E with a phase $\theta$ is delivered from interdigital transducer (R). In short, the electric signal E is delivered from interdigital transducer (R) only when touching the position $F_x$ causing a low voltage operation and low power consumption. The position $F_x$ corresponds to an electric signal $E_x$ with a phase $\theta_x$. In this time, the total electric signal $\Sigma E_j$ minus the electric signal $E_x$ is equal to the electric signal E, and the total phase $\Sigma\theta_j$ minus the phase $\theta_x$ is equal to the phase $\theta$. In other words, only the surface acoustic wave on the minute propagation lane $Z_x$ is disappeared and is not transducer to the electric signal $E_x$ when touching the position $F_x$. As a result, the electric signal E being equal to the total electric signal $\Sigma E_j$ minus the electric signal $E_x$ is delivered from interdigital transducer (R). Thus, the position $F_x$ is detected from the phase $\theta_x$ corresponding to the electric signal $E_x$. The electric signal transmitted from oscillator (2) to phase comparator (4) via attenuator (3) has the phase approximately equal to the total phase $\Sigma\theta_j$, that is zero. Accordingly, phase comparator (4) detects a difference between the phase of the electric signal transmitted from oscillator (2) to phase comparator (4) and the phase $\theta$ of the electric signal E delivered from interdigital transducer (R), the phase difference corresponding to the phase $\theta_x$.

Figure 4:
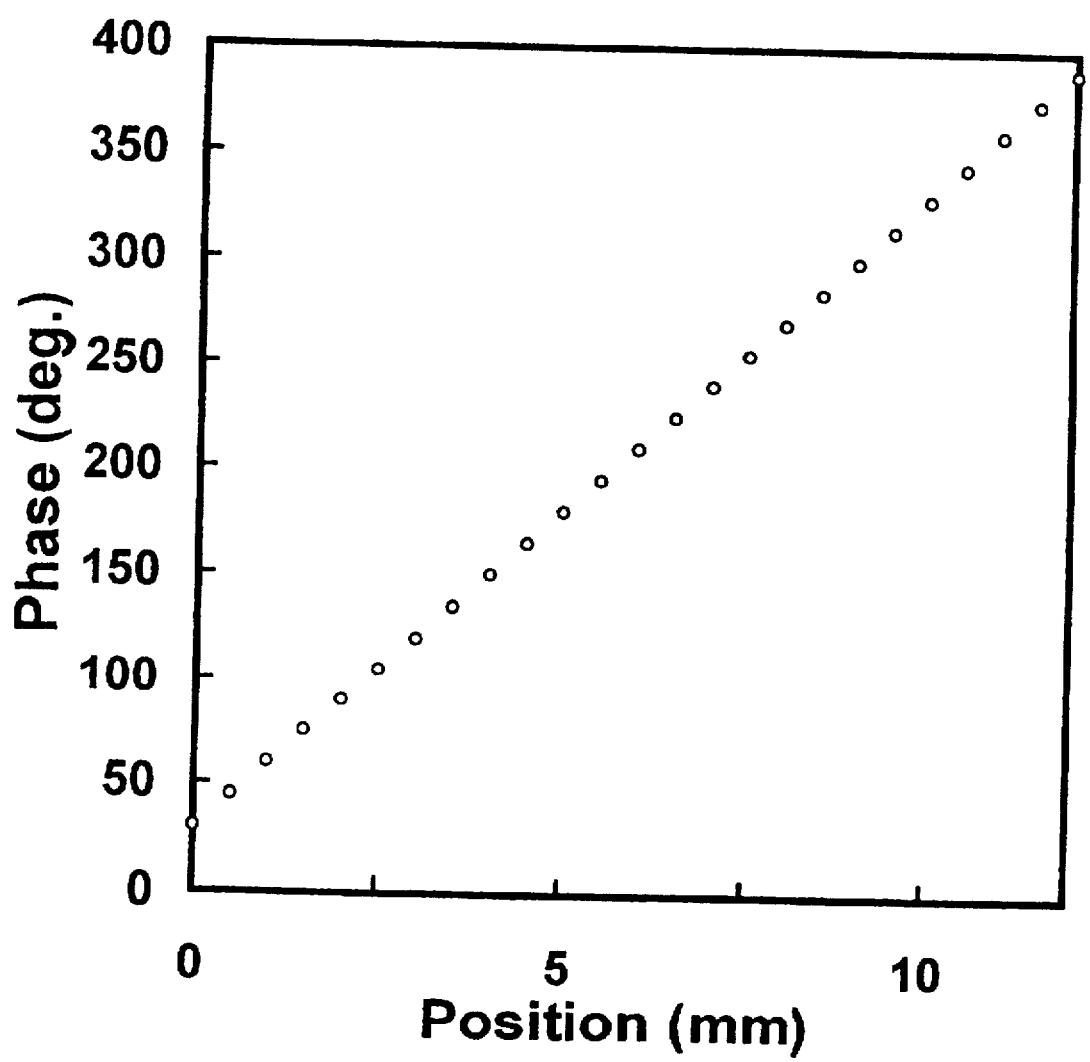
FIG. 4 shows a relationship between a touch-position $F_x$ and a phase $θ_x$ detected by phase comparator (4).

FIG. 4 shows a relationship between a touch-position $F_x$ and a phase $\theta_x$ detected by phase comparator (4). The distance between the touch-position $F_x$ and a touch-position $F_{x+1}$ is 0.5 mm. There exists a linear relationship between the touch-position $F_x$ and the phase $\theta_x$.

Figure 5:
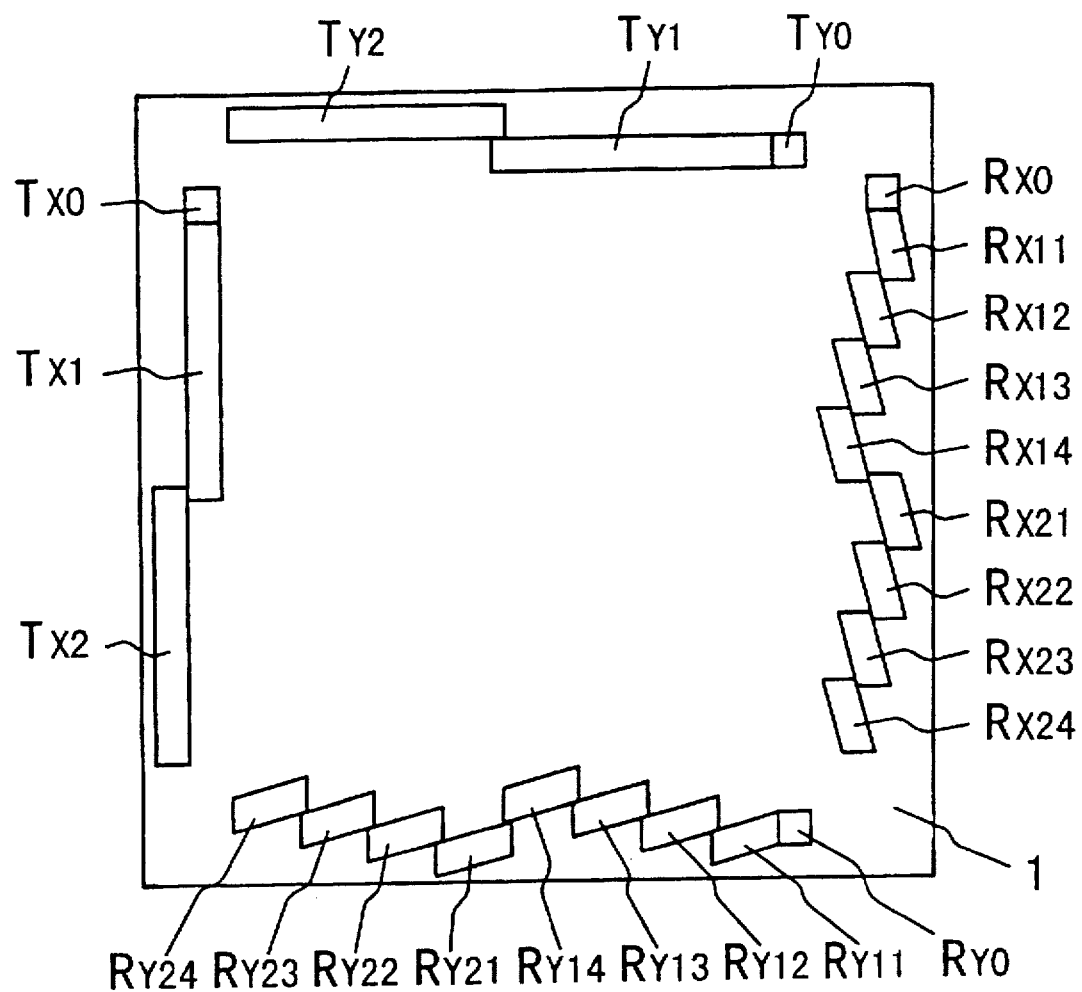
FIG. 5 shows a plan view of a surface acoustic wave position-sensing device according to a second embodiment of the present invention.

FIG. 5 shows a plan view of a surface acoustic wave position-sensing device according to a second embodiment of the present invention. The surface acoustic wave position-sensing device comprises piezoelectric substrate (1), controlling system (5), switches ($W_1$ and $W_2$), amplifier ($A_x$) and surface acoustic wave transducing units (X and Y). Surface acoustic wave transducing unit (X) comprises input interdigital transducers ($T_{x0}$, $T_{x1}$ and $T_{x2}$) and output interdigital transducers ($R_{x0}$, $R_{x11}$, $R_{x12}$, $R_{x13}$, $R_{x14}$, $R_{x21}$, $R_{22}Rx_{23}$ and $Rx_{24}$). Surface acoustic wave transducing unit (Y) comprises input interdigital transducers ($T_{y0}$, $T_{y1}$ and $T_{y2}$) and output interdigital transducers ($R_{y0}$, $R_{y11}$, $R_{y12}$, $R_{y13}$, $R_{y14}$, $R_{y21}$, $R_{y22}$, $R_{y23}$ and $R_{y24}$). FIG. 5 shows only piezoelectric substrate (1) and each interdigital transducer made from aluminium thin film and formed on the upper end surface of piezoelectric substrate (1). Interdigital transducers ($T_{x0}$, $R_{x0}$, $T_{y0}$ and $R_{y0}$) have the same common-type constructions with an overlap length shorter than that of interdigital transducers ($T_{x1}$, $T_{x2}$, $T_{y1}$ and $T_{y2}$) having the same common-type constructions. Interdigital transducers ($R_{x11}$, $R_{x12}$, $R_{x13}$, $R_{x14}$, $R_{x21}$, $R_{x22}$, $R_{x23}$, $R_{x24}$, $R_{y11}$, $R_{y12}$, $R_{y13}$, $R_{y14}$, $R_{y21}$, $R_{y22}$, $R_{y23}$ and $R_{y24}$) have the same constructions. The finger direction of interdigital transducers ($R_{x11}$, $R_{x12}$, $R_{x13}$, $R_{x14}$, $R_{x21}$, $R_{x22}$, $R_{x23}$ and $R_{x24}$) is not parallel to that of interdigital transducers ($T_{x1}$ and $T_{x2}$). The finger direction of interdigital transducers ($R_{y11}$, $R_{y12}$, $R_{y13}$, $R_{y14}$, $R_{y21}$, $R_{y22}$, $R_{y23}$ and $R_{y24}$) is not parallel to that of interdigital transducers ($T_{y1}$ and $T_{y2}$).

Figure 6:
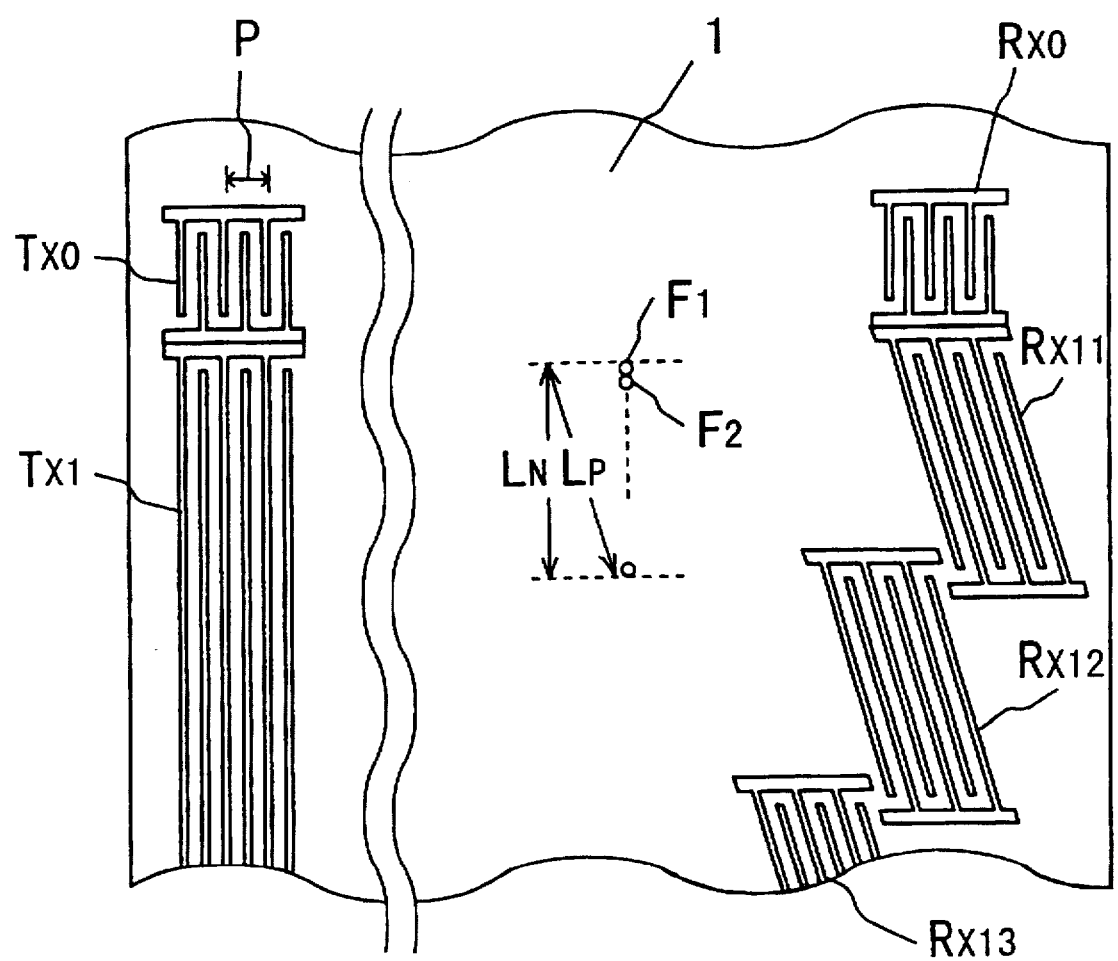
FIG. 6 shows a fragmentary plan view, on an enlarged scale, of the surface acoustic wave position-sensing device in FIG. 5.

FIG. 6 shows a fragmentary plan view, on an enlarged scale, of the surface acoustic wave position-sensing device in FIG. 5. Each interdigital transducer consists of ten finger pairs, respectively. Each of interdigital transducers ($T_{x0}$, $R_{x0}$, $T_{y0}$ and $R_{y0}$) has an interdigital periodicity P of 400 μm and an overlap length of 1 mm. Each of interdigital transducers ($T_{x1}$, $T_{x2}$, $T_{y1}$ and $T_{y2}$) has an interdigital periodicity P of 400 μm and an overlap length L of 12 mm. The sum of each overlap length $L_N$, along the finger direction of interdigital transducer ($T_{x1}$), of interdigital transducers ($R_{x11}$, $R_{x12}$, $R_{x13}$ and $R_{x14}$) is equal to the overlap length L. The sum of each overlap length $L_N$, along the finger direction of interdigital transducer ($T_{x2}$), of interdigital transducers ($R_{x21}$, $R_{x22}$, $R_{x23}$ and $R_{x24}$) is equal to the overlap length L. The sum of each overlap length $L_N$, along the finger direction of interdigital transducer ($T_{y1}$), of interdigital transducers ($R_{y11}$, $R_{y12}$, $R_{y13}$ and $R_{y14}$) is equal to the overlap length L. The sum of each overlap length $L_N$, along the finger direction of interdigital transducer ($T_{y2}$), of interdigital transducers ($R_{y21}$, $R_{y22}$, $R_{y23}$ and $R_{y24}$) is equal to the overlap length L. In the surface acoustic wave position-sensing device, it is possible to sense a touch on one of positions $F_j$ (j=1, 2, . . . , $\chi$), along the finger direction of interdigital transducer ($T_{x1}$ or $T_{x2}$), within each overlap length $L_N$ of interdigital transducers ($R_{x11}$, $R_{x12}$, $R_{x13}$, $R_{x14}$, $R_{x21}$, $R_{x22}$, $R_{x23}$ and $R_{x24}$). In the same way, it is possible to sense a touch on one of positions $F_j$ (j=1, 2, . . . , $\chi$), along the finger direction of interdigital transducer ($T_{y1}$ or $T_{y2}$), within each overlap length $L_N$ of interdigital transducers ($R_{y11}$, $R_{y12}$, $R_{y13}$, $R_{y14}$, $R_{y21}$, $R_{y22}$, $R_{y23}$ and $R_{y24}$).

Each of interdigital transducers ($R_{x11}$, $R_{x12}$, $R_{x13}$, $R_{x14}$, $R_{x21}$, $R_{x22}$, $R_{x23}$ and $R_{x24}$) is, as interdigital transducer (R) shown in FIG. 2, located such that the finger direction thereof is slanting to that of interdigital transducer ($T_{x1}$ or $T_{x2}$) by an angle $\alpha$. In the same way, each of interdigital transducers ($R_{y11}$, $R_{y12}$, $R_{y13}$, $R_{y14}$, $R_{y21}$, $R_{y22}$, $R_{y23}$ and $R_{y24}$) is located such that the finger direction thereof is slanting to that of interdigital transducer ($T_{y1}$ or $T_{y2}$) by an angle $\alpha$. An interdigital periodicity $P_N$, along the vertical direction to the finger direction of interdigital transducers ($R_{11}$, $R_{x12}$, $R_{x13}$, $R_{x14}$, $R_{x21}$, $R_{x22}$, $R_{x23}$ and $R_{x24}$) is, as interdigital transducer (R) shown in FIG. 2, equal to the product of the interdigital periodicity P and cos $\alpha$. In the same way, an interdigital periodicity $P_N$, along the vertical direction to the finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is equal to the product of the interdigital periodicity P and cos α. Each overlap length $L_p$, along the finger direction of interdigital transducers ($R_{x11}$, $R_{x12}$, $R_{x13}$ and $R_{x14}$), of interdigital transducers ($R_{x11}$, $R_{x12}$, $R_{x13}$ and $R_{x14}$) is equal to the product of the overlap length $L_N$ and sec α. In other words, the sum of each overlap length $L_p$ of interdigital transducers ($R_{x11}$, $R_{x12}$, $R_{x13}$ and $R_{x14}$) is equal to the product of the overlap length L and sec α. In the same way, the sum of each overlap length $L_p$ of interdigital transducers ($R_{x21}$, $R_{x22}$, $R_{x23}$ and $R_{x24}$) is equal to the product of the overlap length L and sec α. The sum of each overlap length $L_p$ of interdigital transducers ($R_{Y11}$, $R_{Y12}$, $R_{Y13}$ and $R_{Y14}$) is equal to the product of the overlap length L and sec α. The sum of each overlap length $L_p$ of interdigital transducers ($R_{Y21}$, $R_{Y22}$, $R_{Y23}$ and $R_{Y24}$) is equal to the product of the overlap length L and sec α.

Figure 7:
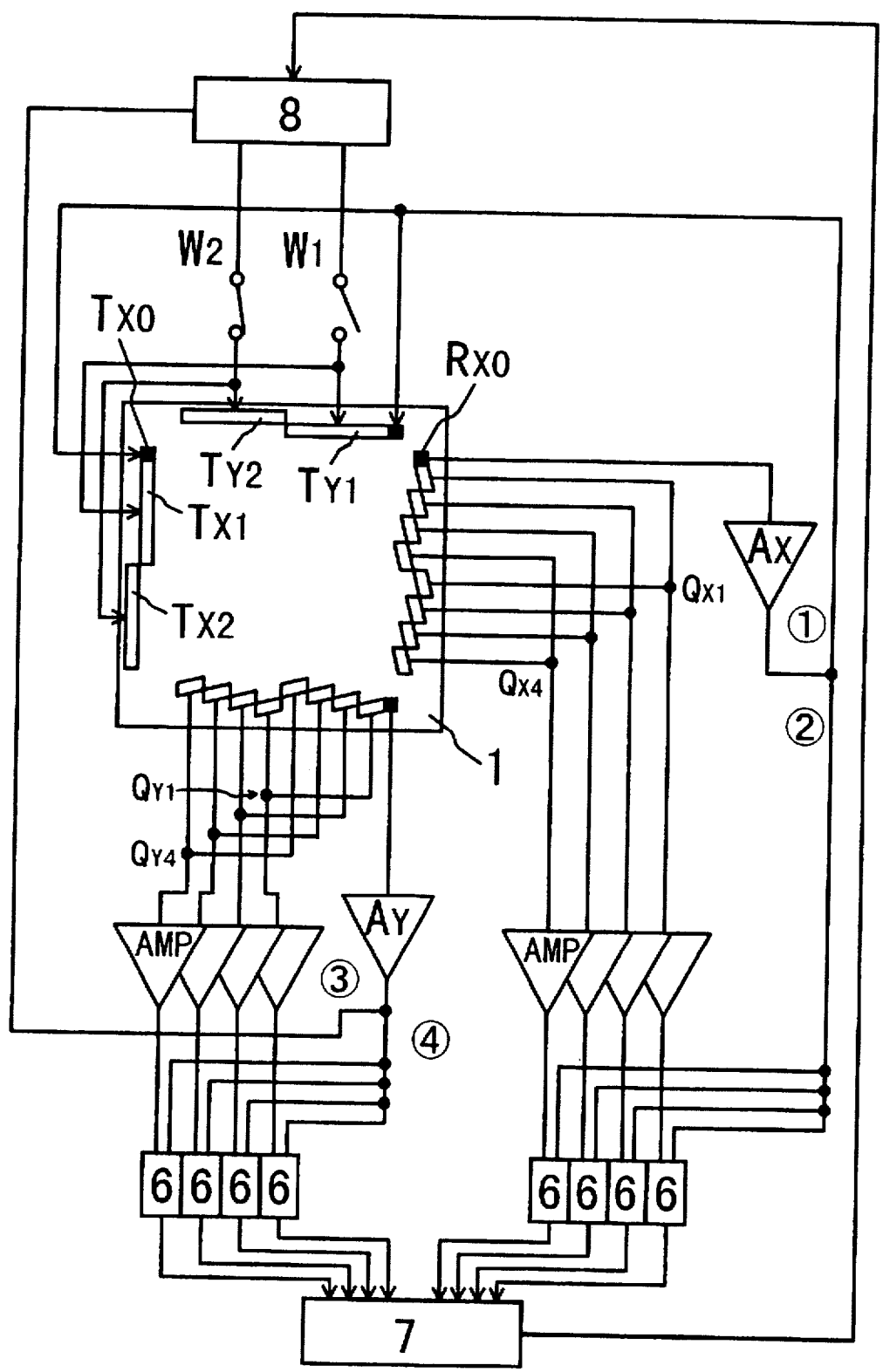
FIG. 7 shows a diagram of a driving circuit of the surface acoustic wave position-sensing device in FIG. 5.

FIG. 7 shows a diagram of a driving circuit of the surface acoustic wave position-sensing device in FIG. 5. Controlling system (5) comprises eight phase comparators (6), computer (7) and switch-change unit (8). Output terminal of switch ($W_1$) is connected with input terminals of interdigital transducers ($T_{x1}$ and $T_{Y1}$). Output terminal of switch ($W_2$) is connected with input terminals of interdigital transducers ($T_{x2}$ and $T_{Y2}$). A point $Q_{x1}$ joining output terminals of interdigital transducers ($R_{x11}$ and $R_{x21}$), a point $Q_{x2}$ joining output terminals of interdigital transducers ($R_{x12}$ and $R_{x22}$), a point $Q_{x3}$ joining output terminals of interdigital transducers ($R_{x13}$ and $R_{23}$), and a point $Q_{x4}$ joining output terminals of interdigital transducers ($R_{x14}$ and $R_{x24}$) are connected with phase comparators (6) via amplifiers (AMP), respectively. In the same way, a point $Q_{Y1}$ joining output terminals of interdigital transducers ($R_{Y11}$ and $R_{Y21}$), a point $Q_{Y2}$ joining output terminals of interdigital transducers ($R_{Y12}$ and $R_{Y22}$), a point $Q_{Y3}$ joining output terminals of interdigital transducers ($R_{Y13}$ and $R_{Y23}$), and a point $Q_{Y4}$ joining output terminals of interdigital transducers ($R_{Y14}$ and $R_{Y24}$) are connected with phase comparators (6) via amplifiers (AMP), respectively.

In the driving circuit in FIG. 7, when an electric signal having a frequency approximately corresponding to the interdigital periodicity P is applied to interdigital transducers ($T_{xo}$, $T_{x1}$ and $T_{x2}$), respectively, the surface acoustic wave having the wavelength approximately equal to the interdigital periodicity P is excited on the upper end surface of piezoelectric substrate (1) effectively. The surface acoustic wave excited by interdigital transducer ($T_{xo}$) is transducer to an electric signal with a phase $\theta_{base}$ by interdigital transducer ($R_{xo}$), the electric signal being delivered from interdigital transducer ($R_{xo}$) and amplified by amplifier ($A_x$). An electric signal ① is applied to interdigital transducers ($T_{xo}$ and $T_{Yo}$). Thus, interdigital transducers ($T_{xo}$ and $R_{xo}$), a propagation lane, as a delay element, of a surface acoustic wave between interdigital transducers ($T_{xo}$ and $R_{xo}$), and amplifier ($A_x$) form an oscillator, causing not only a low voltage operation and low power consumption, but also a small-sized circuit with a simple structure. An electric signal ② is applied to four phase comparators (6). The surface acoustic wave excited by interdigital transducer ($T_{x1}$) is transducer to electric signals $E_j$ (j=1, 2,..., χ) with phases $\theta_j$ (j=1, 2,..., χ) by each of interdigital transducers ($R_{x11}$, $R_{x12}$, $R_{x13}$ and $R_{x14}$), the phases $\theta_j$ corresponding to the positions $F_j$, respectively. The surface acoustic wave excited by interdigital transducer ($T_{x2}$) is transducer to electric signals $E_j$ (j=1, 2,..., χ) with phases $\theta_j$ (j=1, 2,..., χ) by each of interdigital transducers ($R_{x21}$, $R_{x22}$, $R_{x23}$ and $R_{x24}$), the phases $\theta_j$ corresponding to the positions $F_j$, respectively. Each electric signal $E_j$ has a frequency approximately corresponding to the interdigital periodicity P. The total phase $\Sigma \theta_j$ made by phases $\theta_j$ is zero. The total electric signal $\Sigma E_j$ made by electric signals $E_j$ is also zero and is not able to be detected at each of interdigital transducers ($R_{x11}$, $R_{12}$, $R_{13}$, $R_{14}$, $R_{21}$, $R_{22}$, $R_{23}$ and $R_{24}$).

In the driving circuit in FIG. 7, when an electric signal having a frequency approximately corresponding to the interdigital periodicity P is applied to interdigital transducers ($T_{Yo}$, $T_{Y1}$ and $T_{Y2}$), respectively, the surface acoustic wave having the wavelength approximately equal to the interdigital periodicity P is excited on the upper end surface of piezoelectric substrate (1) effectively. The surface acoustic wave excited by interdigital transducer ($T_{Yo}$) is transducer to an electric signal with a phase $\theta_{base}$ by interdigital transducer ($R_{Yo}$), the electric signal being delivered from interdigital transducer ($R_{Yo}$) and amplified by amplifier ($A_Y$). An electric signal ③ is applied to switch-change unit (8), and an electric signal ④ is applied to four phase comparators (6). Switch-change unit (8) under a control of computer (7) turns on and off switches ($W_1$ and $W_2$) alternately, and supplies a group of interdigital transducers ($T_{x1}$ and $T_{Y1}$), and a group of interdigital transducers ($T_{x2}$ and $T_{Y2}$) with the electric signal ③ alternately. The surface acoustic wave excited by interdigital transducer ($T_{Y1}$) is transducer to electric signals $E_j$ (j=1, 2,..., χ) with phases $\theta_j$ (j=1, 2,..., χ) by each of interdigital transducers ($R_{Y11}$, $R_{Y12}$, $R_{Y13}$ and $R_{Y14}$), the phases $\theta_j$ corresponding to the positions $F_j$, respectively. The surface acoustic wave excited by interdigital transducer ($T_{Y2}$) is transducer to electric signals $E_j$ (j=1, 2,..., χ) with phases $\theta_j$ (j=1, 2,..., χ) by each of interdigital transducers ($R_{Y21}$, $R_{Y22}$, $R_{Y23}$ and $R_{Y24}$), the phases $\theta_j$ corresponding to the positions $F_j$, respectively. Each electric signal $E_j$ has a frequency approximately corresponding to the interdigital periodicity P. The total phase $\Sigma \theta_j$ made by phases $\theta_j$ is zero. The total electric signal $\Sigma E_j$ made by electric signals $E_j$ is also zero and is not able to be detected at each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$).

Interdigital transducer ($T_{x1}$) and interdigital transducers ($R_{x11}$, $R_{x12}$, $R_{x13}$ and $R_{x14}$) form four propagation lanes ($D_{x11}$, $D_{x12}$, $D_{x13}$ and $D_{x14}$) of the surface acoustic wave on the upper end surface of piezoelectric substrate (1), respectively, each propagation lane consisting of minute propagation lanes $Z_j$ (j=1, 2,..., χ) corresponding to the positions $F_j$. Interdigital transducer ($T_{x2}$) and interdigital transducers ($R_{x21}$, $R_{x22}$, $R_{23}$ and $R_{x24}$) form four propagation lanes ($D_{x21}$, $D_{x22}$, $D_{x23}$ and $D_{x24}$) of the surface acoustic wave on the upper end surface of piezoelectric substrate (1), respectively, each propagation lane consisting of minute propagation lanes $Z_j$ (j=1, 2,..., χ) corresponding to the positions $F_j$. In the same way, interdigital transducer ($T_{Y1}$) and interdigital transducers ($R_{Y11}$, $R_{Y12}$, $R_{13}$ and $R_{Y14}$) form four propagation lanes ($D_{Y11}$, $D_{Y12}$, $D_{Y13}$ and $D_{Y14}$) of the surface acoustic wave on the upper end surface of piezoelectric substrate (1), respectively, each propagation lane consisting of minute propagation lanes $Z_j$ (j=1, 2,..., χ) corresponding to the positions $F_j$. Interdigital transducer ($T_{Y2}$) and interdigital transducers ($R_{Y21}$, $R_{Y22}$, $R_{Y23}$ and $R_{Y24}$) form four propagation lanes ($D_{Y21}$, $D_{Y22}$, $D_{Y23}$ and $D_{Y24}$) of the surface acoustic wave on the upper end surface of piezoelectric substrate (1), respectively, each propagation lane consisting of minute propagation lanes $Z_j$ (j=1, 2,..., χ) corresponding to the positions $F_j$.

When touching a position $F_x$ out of the positions $F_j$ in FIG. 6, on a minute propagation lane $Z_x$ out of the minute propagation lanes $Z_j$ of one of the propagation lanes ($D_{x11}$, $D_{x12}$, $D_{x13}$, $D_{x14}$, $D_{x21}$, $D_{x22}$, $D_{x23}$ and $D_{x24}$), an electric signal E with a phase θ is delivered from one of interdigital transducers ($R_{x11}$, $R_{x12}$, $R_{x13}$, $R_{x14}$, $R_{x21}$, $R_{x22}$, $R_{x23}$ and $R_{x24}$). In this time, only the surface acoustic wave on the minute propagation lane $Z_x$ is disappeared and is not transducer to an electric signal $E_x$ with a phase $θ_x$. As a result, the electric signal E being equal to the total electric signal $ΣE_j$ minus the electric signal $E_x$ is delivered from one of interdigital transducers ($R_{x11}$, $R_{x12}$, $R_{x13}$, $R_{x14}$, $R_{x21}$, $R_{x22}$, $R_{x23}$ and $R_{x24}$), the phase θ being equal to the total phase $Σθ_j$ minus the phase $θ_x$, that is ($θ=Σθ_j–θ_x=-θ_x$). Phase comparator (6) detects a difference between the phase θ and the phase $θ_{base}$, only when the phase comparator (6) is applied with the electric signal E. Computer (7) finds the position $F_x$ from the phase difference ($θ_{base}–θ$). In the same way, when touching a position $F_x$ on a minute propagation lane $Z_x$ out of one of the propagation lanes ($D_{Y11}$, $D_{Y12}$, $D_{Y13}$, $D_{Y14}$, $D_{Y21}$, $D_{Y22}$, $D_{Y23}$ and $R_{Y24}$), an electric signal E with a phase θ is delivered from one of interdigital transducers ($R_{Y11}$, $R_{Y12}$, $R_{Y13}$, $R_{Y14}$, $R_{Y21}$, $R_{Y22}$, $R_{Y23}$ and $R_{Y24}$). In this time, only the surface acoustic wave on the minute propagation lane $Z_x$ is disappeared and is not transducer to an electric signal $E_x$ with a phase $θ_x$, the electric signal E being equal to the total electric signal $ΣE_j$ minus the electric signal $E_x$, the phase θ being equal to the total phase $Σθ_j$ minus the phase $θ_x$. Phase comparator (6) detects a difference between the phase θ and the phase $θ_{base}$, only when the phase comparator (6) is applied with the electric signal E. Computer (7) finds the position $F_x$ from the phase difference ($θ_{base}–θ$).

As mentioned previously, switch-change unit (8) under a control of computer (7) turns on and off switches ($W_1$ and $W_2$) alternately. At the same time, computer (7) detects switch ($W_1$ or $W_2$) closed when the electric signal E appears at one of the points $Q_{x1}$, $Q_{x2}$, $Q_{x3}$ and $Q_{x4}$. Thus, for example, if switch ($W_2$) is closed when the electric signal E appears at the point $Q_{x3}$, it is clear that the electric signal E is delivered from interdigital transducer ($R_{x23}$). Therefore, it is clear that the touch-position $F_x$ is on the minute propagation lane $Z_x$ out of the propagation lane ($D_{x23}$). In the same way, computer (7) detects switch ($W_1$ or $W_2$) closed when the electric signal E appears at the point $Q_{Y1}$, $Q_{Y2}$, $Q_{Y3}$ and $Q_{Y4}$. For example, if switch ($W_1$) is closed when the electric signal E appears at the point $Q_{Y1}$, it is clear that the touch-position $F_x$ is on the minute propagation lane $Z_x$ out of the propagation lane ($D_{Y11}$). Since eight propagation lanes ($D_{x11}$, $D_{x12}$, $D_{x13}$, $D_{x14}$, $D_{x21}$, $D_{x22}$, $D_{x23}$ and $D_{x24}$) and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) cross each other, it is clear that the touch-position $F_x$ exists on a crossing point made by the minute propagation lane $Z_x$ out of the propagation lane ($D_{x23}$) and the minute propagation lane $Z_x$ out of the propagation lane ($D_{Y11}$). In addition, eight propagation lanes ($D_{x11}$, $D_{x12}$, $D_{x13}$, $D_{x14}$, $D_{x21}$, $D_{x22}$, $D_{x23}$ and $D_{x24}$) are closed each other, and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) are also closed each other. Accordingly, there is no null touch-point on the upper end surface of piezoelectric substrate (1). In order to make no null touch-point, it is also effective to arrange eight propagation lanes ($D_{x11}$, $D_{x12}$, $D_{x13}$, $D_{x14}$, $D_{x21}$, $D_{x22}$, $D_{x23}$ and $D_{x24}$) as they are partially overlapping each other, and arrange eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) as they are partially overlapping each other.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A surface acoustic wave position-sensing device comprising:

a piezoelectric substrate having an upper—and a lower end surfaces running perpendicular to the direction of the thickness d thereof;

an input interdigital transducer T formed on said upper end surface of said piezoelectric substrate, said thickness d being larger than three times an interdigital periodicity P of said interdigital transducer T; and an output interdigital transducer R formed on said upper end surface of said piezoelectric substrate such that the finger direction of said interdigital transducer R is slanting to that of said interdigital transducer T by an angle α, an interdigital periodicity $P_N$ along the vertical direction to the finger direction of said interdigital transducer R being equal to the product of said interdigital periodicity P and cos α, said interdigital transducer T receiving an electric signal with a frequency approximately corresponding to said interdigital periodicity P, and exciting a surface acoustic wave on said upper end surface of said piezoelectric substrate, said surface acoustic wave having the wavelength approximately equal to said interdigital periodicity P, said interdigital transducer R transducing said surface acoustic wave to electric signals $E_j$ (j=1, 2, . . . , χ) with phases $θ_j$ (j=1, 2, . . . , χ), respectively, said phases $θ_j$ corresponding to positions $F_j$ (j=1, 2, . . . , χ) on said upper end surface of said piezoelectric substrate, respectively, each electric signal $E_j$ having a frequency approximately corresponding to said interdigital periodicity P, the total phase $Σθ_j$ made by said phases $θ_j$ being zero, the total electric signal $ΣE_j$ made by said electric signals $E_j$ being zero and not able to be detected at said interdigital transducer R, said interdigital transducers T and R forming minute propagation lanes $Z_j$ (j=1, 2, . . . , χ) of the surface acoustic wave on said upper end surface of said piezoelectric substrate, said minute propagation lanes $Z_j$ corresponding to said positions $F_j$, said interdigital transducer R delivering an electric signal E with a phase θ only when touching with a finger or others on a position $F_x$ out of said positions $F_j$, on a minute propagation lane $Z_x$ out of said minute propagation lanes $Z_j$, said position $F_x$ corresponding to an electric signal $E_x$ with a phase $θ_x$, said total electric signal $ΣE_j$ minus said electric signal $E_x$ being equal to said electric signal E, said total phase $Σθ_j$ minus said phase $θ_x$ being equal to said phase θ.

2. A surface acoustic wave position-sensing device as defined in claim 1, wherein an overlap length $L_P$ along the finger direction of said interdigital transducer R is equal to the product of an overlap length L of said interdigital transducer T and sec α.

3. A surface acoustic wave position-sensing device as defined in claim 1, wherein said piezoelectric substrate is made of a piezoelectric ceramic, the polarization axis thereof being parallel to the thickness direction thereof.

4. A surface acoustic wave position-sensing device comprising:

a piezoelectric substrate having an upper—and a lower end surfaces running perpendicular to the direction of the thickness d thereof;

two surface acoustic wave transducing units X and Y, each thereof consisting of an input interdigital transducer To formed on said upper end surface of said piezoelectric substrate, N input interdigital transducers $T_i$ (i=1, 2, ..., N) formed on said upper end surface of said piezoelectric substrate, an output interdigital transducer $R_o$ opposed to said interdigital transducer $T_o$ on said upper end surface of said piezoelectric substrate and placed such that the finger direction of said interdigital transducer $R_o$ runs parallel with that of said interdigital transducer $T_o$, said thickness d being larger than three times an interdigital periodicity P of said interdigital transducers $T_o$, $T_i$ and $R_o$, and at least two output interdigital transducers $R_{i1}$ and $R_{i2}$ (i=1, 2, ..., N) opposed to each interdigital transducer $T_i$ on said upper end surface of said piezoelectric substrate and placed such that the finger direction of said interdigital transducers $R_{i1}$ and $R_{i2}$ is slanting to that of said interdigital transducer $T_i$ by an angle α, respectively, an interdigital periodicity $P_N$ along the vertical direction to the finger direction of said interdigital transducers $R_{i1}$ and $R_{i2}$ being equal to the product of said interdigital periodicity P and cos α; and a controlling system connected with said surface acoustic wave transducing units X and Y.

each of said interdigital transducers $T_o$ and $T_i$ receiving an electric signal with a frequency approximately corresponding to said interdigital periodicity P, and exciting a surface acoustic wave on said upper end surface of said piezoelectric substrate, said surface acoustic wave having the wavelength approximately equal to said interdigital periodicity P, said interdigital transducer $R_o$ transducing said surface acoustic wave excited by said interdigital transducer $T_o$ to an electric signal with a phase $θ_{base}$ and delivering said electric signal, each of said interdigital transducers $R_{i1}$ and $R_{i2}$ transducing said surface acoustic wave excited by each interdigital transducer $T_i$ to electric signals $E_j$ (j=1, 2, ..., χ) with phases $θ_j$ (j=1, 2, ..., χ), respectively, said phases $θ_j$ corresponding to positions $F_j$ (j=1, 2, ..., χ) on said upper end surface of said piezoelectric substrate, respectively, each electric signal $E_j$ having a frequency approximately corresponding to said interdigital periodicity P, the total phase $Σθ_j$ made by said phases $θ_j$ being zero, the total electric signal $ΣE_j$ made by said electric signals $E_j$ being zero and not able to be detected at each of said interdigital transducers $R_{i1}$ and $R_{i2}$, said interdigital transducers $T_i$ and $R_{i1}$ forming N propagation lanes $D_{i1}$ (i=1, 2, ..., N) of the surface acoustic wave on said upper end surface of said piezoelectric substrate, each propagation lane $D_{i1}$ consisting of minute propagation lanes $Z_j$ (j=1, 2, ..., χ) corresponding to said positions $F_j$, said interdigital transducers $T_i$ and $R_{i2}$ forming N propagation lanes $D_{i2}$ (i=1, 2, ..., N) of the surface acoustic wave on said upper end surface of said piezoelectric substrate, each propagation lane $D_{i2}$ consisting of minute propagation lanes $Z_j$ (j=1, 2, ..., χ) corresponding to said positions $F_j$, one of said interdigital transducers $R_{i1}$ and $R_{i2}$ delivering an electric signal E with a phase θ only when touching a position $F_x$, out of said positions $F_j$, on a minute propagation lane $Z_x$ out of said minute propagation lanes $Z_j$, said position $F_x$ corresponding to an electric signal $E_x$ with a phase $θ_x$, said total electric signal $ΣE_j$ minus said electric signal $E_x$ being equal to said electric signal E, said total phase $Σθ_j$ minus said phase $θ_x$ being equal to said phase θ.

said controlling system sensing a touch with a finger or others on said position $F_x$ by an appearance of said electric signal E at said one of said interdigital transducers $R_{i1}$ and $R_{i2}$, and finding said position $F_x$ by detecting said one, delivering said electric signal E, of said interdigital transducers $R_{i1}$ and $R_{i1}$, and by evaluating a difference between said phases θ and $θ_{base}$.

5. A surface acoustic wave position-sensing device as defined in claim 4 further comprising:

N switches $W_i$ (i=1, 2, ..., N) corresponding to said interdigital transducers $T_i$, an output terminal of each switch $W_i$ being connected with an input terminal of each interdigital transducer $T_i$, output terminals of said interdigital transducers $R_{i1}$ being connected with each other at an output point $Q_1$, output terminals of said interdigital transducers $R_{i2}$ being connected with each other at an output point $Q_2$, said controlling system turning on and off said switches $W_i$ with a fixed period in turn, sensing a touch on said position $F_x$ by an appearance of said electric signal E at one of said output points $Q_1$ and $Q_2$, and finding said position $F_x$ by detecting said one, delivering said electric signal E, of said output points $Q_1$ and $Q_2$, by choosing a closed one out of said switches $W_i$ when said electric signal E appears, and by evaluating said difference between said phases θ and $θ_{base}$.

6. A surface acoustic wave position-sensing device as defined in claim 4, wherein the sum of an overlap length $L_P$ along the finger direction of said interdigital transducer $R_{i1}$ and that of said interdigital transducer $R_{i2}$ is approximately equal to the product of an overlap length L of said interdigital transducer $T_i$ and sec α.

7. A surface acoustic wave position-sensing device as defined in claim 4, wherein two neighbors of said propagation lanes $D_{i1}$ and $D_{i2}$ are closed or partially overlapping each other.

8. A surface acoustic wave position-sensing device as defined in claim 4, wherein said propagation lanes $D_{i1}$ and $D_{i2}$ of said surface acoustic wave transducing unit X and that of said surface acoustic wave transducing unit Y are vertical to each other.

9. A surface acoustic wave position-sensing device as defined in claim 4 further comprising:

an amplifier $A_x$, an input terminal of said interdigital transducer $R_o$ of said surface acoustic wave transducing unit X being connected with each input terminal of said interdigital transducer $T_o$ of said surface acoustic wave transducing units X and Y via said amplifier $A_x$, said interdigital transducers $T_o$ and $R_o$ of said surface acoustic wave transducing unit X, a propagation lane of a surface acoustic wave between said interdigital transducers $T_o$ and $R_o$ in said surface acoustic wave transducing unit X, and said amplifier $A_x$ forming an oscillator.

10. A surface acoustic wave position-sensing device as defined in claim 4, wherein said piezoelectric substrate is made of a piezoelectric ceramic, the polarization axis thereof being parallel to the thickness direction thereof.

* * * * *